United States Patent
Wang et al.

(10) Patent No.: US 11,991,766 B2
(45) Date of Patent: May 21, 2024

(54) TECHNIQUES FOR CELL SELECTION FOR DUAL-CONNECTIVITY

(71) Applicant: QUALCOMM Incorporated, San Diego, CA (US)

(72) Inventors: Shuang Wang, Beijing (CN); Bing Leng, Shanghai (CN); Haojun Wang, Shaanxi (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/597,226

(22) PCT Filed: Jul. 29, 2019

(86) PCT No.: PCT/CN2019/098134
§ 371 (c)(1),
(2) Date: Dec. 29, 2021

(87) PCT Pub. No.: WO2021/016787
PCT Pub. Date: Feb. 4, 2021

(65) Prior Publication Data
US 2022/0248487 A1 Aug. 4, 2022

(51) Int. Cl.
*H04W 76/15* (2018.01)
*H04W 36/00* (2009.01)
(Continued)

(52) U.S. Cl.
CPC ....... *H04W 76/15* (2018.02); *H04W 36/0085* (2018.08); *H04W 48/20* (2013.01); *H04W 88/06* (2013.01)

(58) Field of Classification Search
CPC ........... H04W 35/00835; H04W 35/08; H04W 35/0061; H04W 35/0069; H04W 24/08;
(Continued)

(56) References Cited

U.S. PATENT DOCUMENTS 10,039,013 B2 * 7/2018 Periyasamy ............ H04W 4/24
10,728,783 B2 * 7/2020 Hoover .................. H04W 76/28
(Continued)

FOREIGN PATENT DOCUMENTS

| CN | 105359613 A | 2/2016 |
| CN | 106664633 A | 5/2017 |

(Continued)

OTHER PUBLICATIONS

M. Tayyab, X. Gelabert and R. Jäntti, "A Survey on Handover Management: From LTE to NR," in IEEE Access, vol. 7, pp. 118907-118930, 2019, doi: 10.1109/ACCESS.2019.2937405. (Year: 2019).*

(Continued)

*Primary Examiner* — William D Cumming
(74) *Attorney, Agent, or Firm* — Dalei Dong; Harrity & Harrity, LLP

(57) ABSTRACT

A user equipment (UE) may determine that a condition associated with a first radio access technology (RAT) is satisfied. The UE may select a cell, from a list of anchor cells associated with a second RAT and configured for dual-connectivity, for a connection based at least in part on the determination that the condition associated with the first RAT is satisfied. The UE may establish the connection with the selected cell. Numerous other aspects are provided.

24 Claims, 6 Drawing Sheets

(51) Int. Cl.
*H04W 48/20* (2009.01)
*H04W 88/06* (2009.01)

(58) Field of Classification Search
CPC . H04W 24/10; H04W 76/28; H04W 52/0216; H04W 4/24; H04W 76/50; H04W 76/22; H04W 76/10; H04W 76/19; H04W 36/30; H04W 12/08; H04W 76/16; H04W 88/06
USPC .......................................................... 370/331
See application file for complete search history.

(56) References Cited

U.S. PATENT DOCUMENTS

| | | | |
|---|---|---|---|
| 11,212,859 B2* | 12/2021 | Abdel Shahid | H04W 76/16 |
| 11,246,183 B2* | 2/2022 | Kim | H04W 76/50 |
| 11,310,715 B2* | 4/2022 | Kim | H04W 36/00835 |
| 11,323,937 B2* | 5/2022 | Kim | H04W 12/06 |
| 11,564,265 B2* | 1/2023 | Afzal | H04W 76/16 |
| 2014/0301262 A1* | 10/2014 | Homchaudhuri | H04W 52/0216 370/311 |
| 2017/0064691 A1 | 3/2017 | Kubota et al. | |
| 2017/0150386 A1* | 5/2017 | Hoover | H04W 24/10 |
| 2017/0187774 A1* | 6/2017 | Qiu | H04L 43/0894 |
| 2018/0092085 A1 | 3/2018 | Shaheen et al. | |
| 2018/0184307 A1* | 6/2018 | Periyasamy | H04M 15/61 |
| 2018/0270723 A1 | 9/2018 | Kim et al. | |
| 2019/0045577 A1* | 2/2019 | Kim | H04W 76/50 |
| 2019/0053175 A1 | 2/2019 | Kubota et al. | |
| 2019/0174373 A1 | 6/2019 | Kanazawa et al. | |
| 2021/0068018 A1* | 3/2021 | Kim | H04W 88/06 |
| 2021/0160945 A1* | 5/2021 | Abdel Shahid | H04W 76/16 |
| 2021/0251018 A1* | 8/2021 | Afzal | H04W 76/10 |
| 2022/0159779 A1* | 5/2022 | Kim | H04W 12/08 |
| 2022/0201585 A1* | 6/2022 | Kim | H04W 36/00835 |
| 2022/0248487 A1* | 8/2022 | Wang | H04W 24/08 |
| 2022/0264408 A1* | 8/2022 | Kim | H04L 63/0272 |
| 2022/0322182 A1* | 10/2022 | Lee | H04B 7/0617 |
| 2022/0322184 A1* | 10/2022 | Niu | H04B 7/1851 |
| 2023/0124607 A1* | 4/2023 | Hwang | H04W 36/0069 370/331 |
| 2023/0156829 A1* | 5/2023 | Afzal | H04W 76/10 370/328 |
| 2023/0180070 A1* | 6/2023 | C | H04W 36/30 370/331 |

FOREIGN PATENT DOCUMENTS

| | | | | |
|---|---|---|---|---|
| CN | 109891798 A | 6/2019 | | |
| CN | 109983833 A | 7/2019 | | |
| WO | WO-2017087181 A1 * | 5/2017 | ............ | H04W 24/10 |
| WO | 2018219352 A1 | 12/2018 | | |
| WO | 2018231525 A1 | 12/2018 | | |
| WO | WO-2019027291 A1 * | 2/2019 | ............ | H04W 12/08 |
| WO | 2019046028 A1 | 3/2019 | | |
| WO | 2021223152 A1 | 11/2021 | | |

OTHER PUBLICATIONS

International Search Report and Written Opinion—PCT/CN2019/098134—ISA/EPO—dated May 9, 2020.
Supplementary European Search Report—EP19939507—Search Authority—Munich—dated Mar. 31, 2023.

* cited by examiner

TECHNIQUES FOR CELL SELECTION FOR DUAL-CONNECTIVITY

CROSS-REFERENCE TO RELATED APPLICATION

This application is a 371 national stage of Patent Cooperation Treaty (PCT) Application No. PCT/CN2019/098134 filed on Jul. 29, 2019, entitled "TECHNIQUES FOR CELL SELECTION FOR DUAL-CONNECTIVITY," which is hereby expressly incorporated by reference herein.

FIELD OF THE DISCLOSURE

Aspects of the present disclosure generally relate to wireless communication and to techniques and apparatuses for cell selection for dual-connectivity (DC).

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include determining that a condition associated with a first radio access technology (RAT) is satisfied; selecting a cell, from a list of anchor cells associated with a second RAT and configured for dual-connectivity, for a connection based at least in part on the determination that the condition associated with the first RAT is satisfied, wherein, when the condition associated with the first RAT is satisfied, the cell is selected based at least in part on a measurement threshold; and establishing the connection with the selected cell.

In some aspects, the condition associated with the first RAT is based at least in part on at least one of: a mobile-originated data transfer of the UE, a mobile-terminated data transfer of the UE, a data usage command indicating a data requirement, a battery condition of the UE, or a user interaction.

In some aspects, the list of anchor cells is determined by the UE.

In some aspects, the list of anchor cells is based at least in part on system information indicating whether a cell is an anchor cell.

In some aspects, the method further comprises selecting the cell for the connection based at least in part on the cell on which the UE is camped not being an anchor cell.

In some aspects, selecting the cell for the connection further comprises selecting the cell based at least in part on the selected cell being identified by the list of anchor cells and based at least in part on a measurement regarding the selected cell.

In some aspects, establishing the connection on the selected cell further comprises transmitting a service request or a RACH message on the selected cell.

In some aspects, the method may include performing a measurement procedure to identify a handover target, wherein a measurement associated with the selected cell is adjusted for the measurement procedure.

In some aspects, the measurement associated with the selected cell is adjusted to increase a reference signal received power of the selected cell.

In some aspects, the measurement associated with the selected cell is adjusted based at least in part on no Voice over LTE or Video over LTE call being active as the measurement is performed.

In some aspects, the list of anchor cells identifies one or more anchor cells for an E-UTRA-NR dual connectivity (EN-DC) UE.

In some aspects, a UE for wireless communication may include memory and one or more processors operatively coupled to the memory. The memory and the one or more processors may be configured to determine that a condition associated with a first RAT is satisfied; select a cell, from a list of anchor cells associated with a second RAT and configured for dual-connectivity, for a connection based at least in part on the determination that the condition associated with the first RAT is satisfied, wherein, when the condition associated with the first RAT is satisfied, the cell is selected based at least in part on a measurement threshold; and establish the connection with the selected cell.

In some aspects, a non-transitory computer-readable medium may store one or more instructions for wireless communication. The one or more instructions, when executed by one or more processors of a UE, may cause the one or more processors to: determine that a condition associated with a first RAT is satisfied; select a cell, from a list of anchor cells associated with a second RAT and configured for dual-connectivity, for a connection based at least in part on the determination that the condition associated with the first RAT is satisfied, wherein, when the condition associated with the first RAT is satisfied, the cell is selected based at least in part on a measurement threshold; and establish the connection with the selected cell.

In some aspects, an apparatus for wireless communication may include means for determining that a condition associated with a first RAT is satisfied; means for selecting a cell, from a list of anchor cells associated with a second RAT and configured for dual-connectivity, for a connection based at least in part on the determination that the condition associated with the first RAT is satisfied, wherein, when the condition associated with the first RAT is satisfied, the cell is selected based at least in part on a measurement threshold; and means for establishing the connection with the selected cell.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
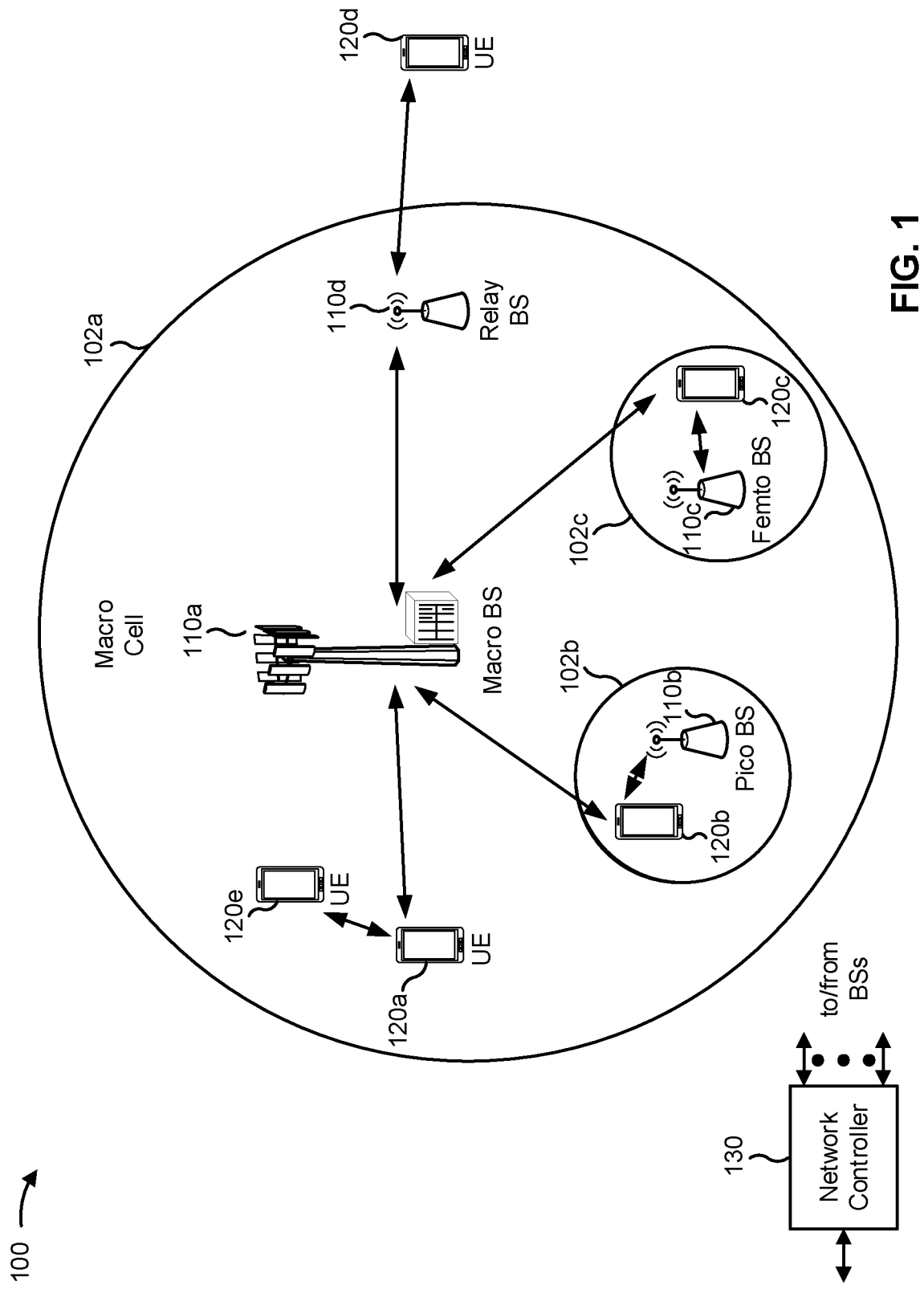
FIG. 1 is a diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
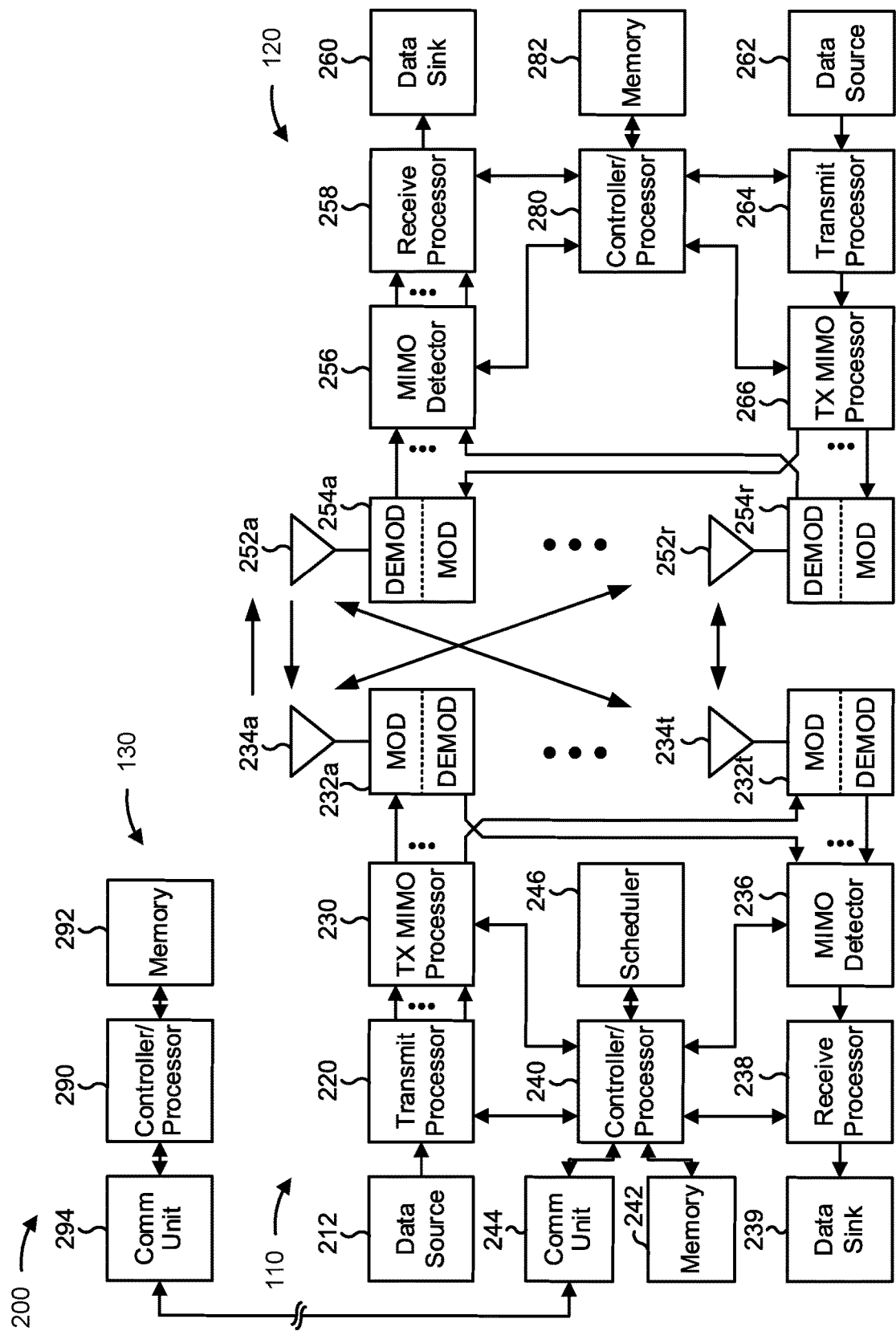
FIG. 2 is a diagram illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general $T \geq 1$ and $R \geq 1$.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with cell selection for dual connectivity, as described in more detail elsewhere herein. For example, controller/processor 240 of base station 110, controller/processor 280 of UE 120, and/or any other component(s) of FIG. 2 may perform or direct operations of, for example, process 500 of FIG. 5 and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 500 of FIG. 5 and/or other processes as described herein. A scheduler 246 may schedule UEs for data transmission on the downlink and/or uplink.

In some aspects, UE 120 may include means for determining that a condition associated with a first radio access technology (RAT) is satisfied; means for selecting a cell, from a list of anchor cells associated with a second RAT and configured for dual-connectivity, for a connection based at least in part on the determination that the condition associated with the first RAT is satisfied, wherein, when the condition associated with the first RAT is satisfied, the cell is selected based at least in part on a measurement threshold; means for establishing the connection with the selected cell; means for determining that a cell on which the UE is camped is not an anchor cell, wherein selecting the cell for the connection is based at least in part on the cell on which the UE is camped not being an anchor cell; means for selecting the cell based at least in part on the selected cell being identified by the list of anchor cells and based at least in part on a measurement regarding the selected cell; means for transmitting a service request or a random access channel (RACH) message on the selected cell; means for performing a measurement procedure to identify a handover target, wherein a measurement associated with the selected cell is adjusted for the measurement procedure; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

As a radio access technology (RAT) is deployed, coverage may be poor or discontinuous in some areas. For example, as 5G/NR is deployed, 5G coverage may be poor in some areas. A UE that experiences poor coverage when using a standalone mode in one RAT may use a non-standalone mode, such as a multi-RAT dual-connectivity (MR-DC) mode, in which the UE contemporaneously connects to two RATs. An example of a non-standalone mode is E-UTRA-NR dual-connectivity (EN-DC) for 5G/NR and 4G/LTE. In EN-DC, the UE may connect to an LTE base station (e.g., an eNB and/or the like) that acts as a master node, and a 5G/NR base station (e.g., a gNB and/or the like) that acts as a secondary node. A cell provided by the LTE base station that acts as the master node may be referred to herein as an anchor cell, an LTE anchor cell, a 4G anchor cell, or a 4G/LTE anchor cell. The UE may camp on an anchor cell that is capable of providing 5G/NR service. An anchor cell may be identified by system information of the anchor cell, such as an upper layer indication system information block (SIB) and/or the like.

In some deployments, not all cells are anchor cells. A UE that connects to a non-anchor cell may not be capable of using an MR-DC mode such EN-DC. Thus, in areas with poor coverage of a RAT such as 5G/NR, the UE may experience poor coverage and diminished throughput if the UE does not connect to an anchor cell. However, anchor cells might not be prioritized over non-anchor cells in some deployments. Thus, the UE may be unlikely to consistently camp on anchor cells, leading to the UE not having a consistent 5G/NR connection, which may cause diminished throughput, diminished reliability, and inconsistent access to 5G/NR technology and features.

Some techniques and apparatuses described herein provide a bias toward anchor cells for a UE when performing cell reselection. For example, the UE may select a cell when connecting to a network based at least in part on a list of anchor cells maintained by the UE. In some aspects, the UE may select a cell from the list of anchor cells when the UE determines that a condition is satisfied (e.g., a condition associated with a preference for a 5G/NR connection, a condition associated with a preference for camping on an anchor cell, and/or the like). In some aspects, the UE may generate the list of anchor cells based at least in part on system information of cells detected by the UE. In some aspects, the UE may perform measurement with a bias toward anchor cells so that the UE is more likely to remain on an anchor cell or be handed over to an anchor cell than to be handed over to a non-anchor cell. In this way, the UE increases the likelihood that the UE camps on and remains on an anchor cell when a condition is satisfied, thereby increasing the likelihood that a RAT such as 5G/NR is available when the condition is satisfied, which increases throughput and reliability and provides access to 5G/NR service and technology.

Figure 3:
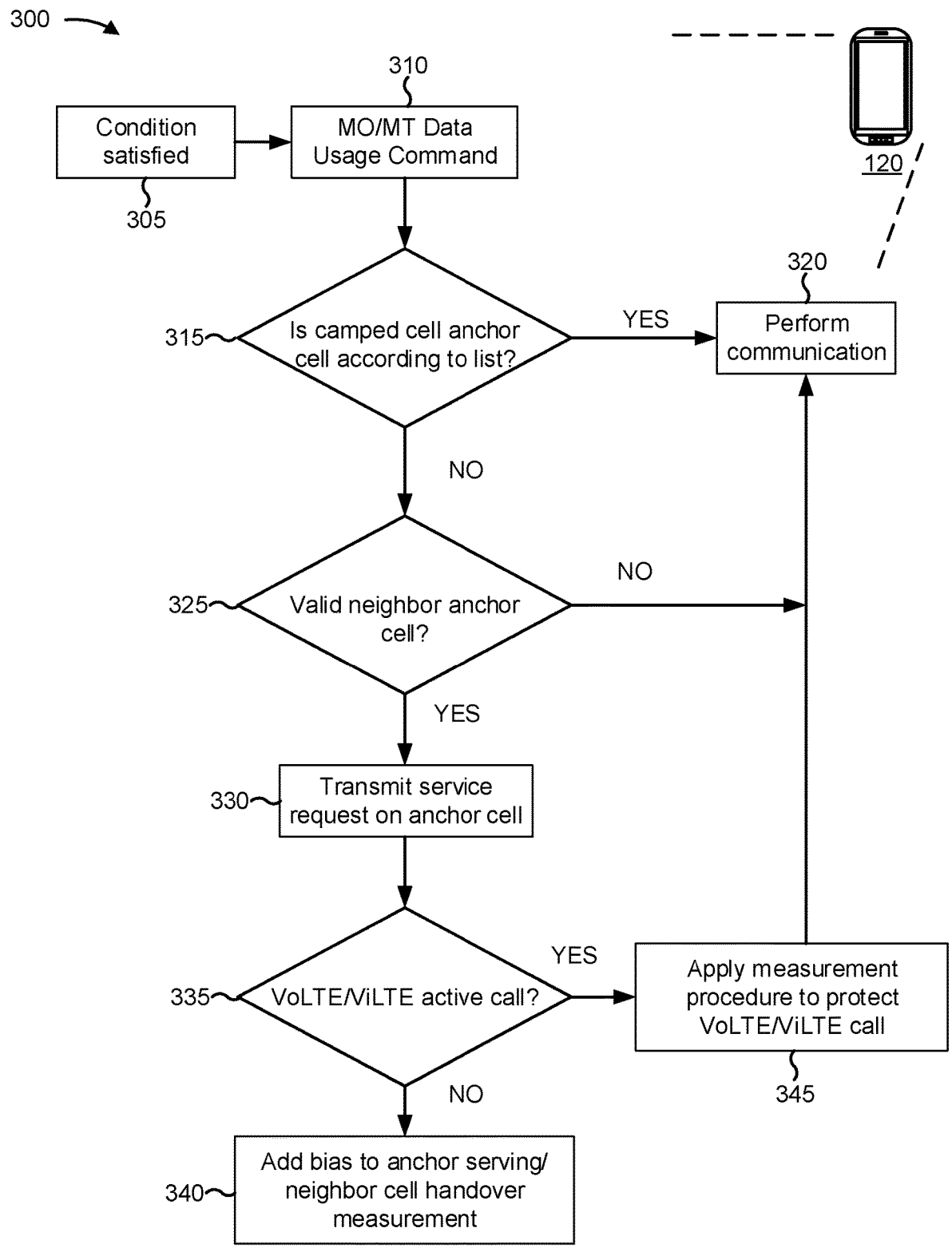
FIG. 3 is a diagram illustrating an example of a procedure for cell selection based at least in part on a list of anchor cells, in accordance with various aspects of the present disclosure.

FIG. 3 is a diagram illustrating an example 300 of a procedure for cell selection based at least in part on a list of anchor cells, in accordance with various aspects of the present disclosure. As shown, the operations described in connection with example 300 may be performed by a UE 120, such as by a modem of the UE 120(4 e.g., which may include MOD/DEMOD 254, TX MIMO processor 266, transmit processor 264, data source 262, and/or the like), an application processor of the UE 120, and/or the like.

As shown by reference number 305, the UE 120 may determine that a condition is satisfied. The condition may relate to a preference to connect to an anchor cell, such as an LTE anchor cell, so that the UE 120 can use MR-DC, such as EN-DC with a 5G/NR secondary cell or secondary cell group. For example, the condition may be associated with a first RAT, such as 5G/NR, and may indicate that the UE 120 is to connect to an anchor cell associated with a second RAT, such as 4G/LTE.

In some aspects, the condition may be based at least in part on a determination by the UE 120. For example, an application processor (AP) of the UE 120 may determine that 5G/NR is to be used or that connection to an anchor cell is to be preferred, and may trigger the condition. In some aspects, the condition may relate to a data requirement of the UE 120, such as an amount of data to be transferred, a data rate needed to transfer the data, a latency requirement of the data, a reliability requirement of the data, a buffer state of the UE 120, scheduled data of the UE 120, and/or the like. In some aspects, a modem of the UE 120 may determine that the condition is satisfied. For example, the modem may determine that the condition is satisfied based at least in part on an indication from the AP, based at least in part on a data transfer (e.g., an ongoing data transfer, a past data transfer, a future data transfer, and/or the like) and/or the like. In some aspects, the condition may be based at least in part on a battery state of the UE 120, a location of the UE 120 (e.g., the UE 120 may determine that the condition is satisfied when the UE 120 is near one or more of the anchor cells identified by a list), a user interface selection received by the UE 120, and/or the like.

As shown by reference number 310, the UE 120 may determine (e.g., receive, generate, and/or the like) a data usage command, such as a mobile-originated (MO) data usage command for an uplink communication or a mobile-terminated (MT) data usage command for a downlink communication. The data usage command may correspond to a data requirement identified by an AP of the UE 120. For example, the data usage command may trigger the UE 120 to connect to a cell, such as by establishing a connection with the cell by entering a radio resource control (RRC) connected mode. In some aspects, the data usage command may be associated with the condition described in connection with reference number 305. For example, the condition may be based at least in part on the data usage command.

As shown by reference number 315, the UE 120 may determine if a cell on which the UE 120 is camped is an anchor cell according to a list of anchor cells. For example, the UE 120 may be camped on a cell in an idle mode, such as an RRC idle mode. The UE 120 may determine if the cell on which the UE 120 is camped is an anchor cell based at least in part on determining that the condition is satisfied. The UE 120 may maintain the anchor cell list, as described in more detail in connection below with FIG. 4. For example, the anchor cell list may include information identifying anchor cells (e.g., anchor cells capable of configuring MR-DC, LTE anchor cells capable of configuring EN-DC, cells associated with an NR capability, and/or the like) and/or information associated with the anchor cells, such as timing information, frequency offset information, system information other than timing information or frequency information, and/or the like.

As shown by reference number 320, if the UE 120 is camped on an anchor cell (block 315—YES), then the UE 120 may perform the communication associated with the data request. For example, if the UE 120 is camped on an anchor cell, the UE 120 may connect to the anchor cell, may initiate MR-DC or EN-DC via the anchor cell, and/or the like. In some aspects, the UE 120 may perform the communication in accordance with a standard, such as the 3GPP standard and/or the like.

As shown by reference number 325, if the UE 120 is not camped on an anchor cell (block 315—NO), then the UE 120 may determine whether the UE 120 detects a valid neighbor anchor cell. A valid neighbor anchor cell may refer to a cell that is identified by the list of anchor cells and that is associated with a measurement that satisfies a threshold. For example, the measurement may include a synchronization signal (SS) measurement, such as a secondary SS (SSS) signal-to-noise ratio (SNR), and/or the like. In some aspects, the measurement may be based at least in part on a transmit power of the UE 120. For example, the measurement may be based at least in part on an initial physical random access channel (PRACH) transmit power. In some aspects, a cell may be a valid neighbor anchor cell when, for example, the SSS SNR is greater than 6 dB and the initial PRACH transmit power is less than 20 dB.

As shown by reference number 330, if the UE 120 detects a valid neighbor anchor cell (block 325—YES), then the UE 120 may establish a connection on the valid neighbor anchor cell. For example, the UE 120 may initiate a connection on the valid neighbor anchor cell, may transmit a service request on the valid neighbor anchor cell, may perform a PRACH procedure on the valid neighbor anchor cell, and/or the like. If the UE 120 does not detect a valid neighbor anchor cell (block 325—NO), then the UE 120 may perform the communication as described in connection with reference number 320. For example, the UE 120 may select and connect to a neighbor cell to perform the communication.

As shown by reference number 335, the UE 120 may determine whether the UE 120 is associated with an active Voice over LTE (VoLTE) or Video over LTE (ViLTE) call (e.g., whether the UE 120 is transmitting or receiving an active VoLTE or ViLTE call). In some aspects, the UE 120 may determine whether the UE 120 is associated with another type of ongoing call or session, such as an ongoing data transfer and/or the like. If the UE 120 is not associated with an active VoLTE or ViLTE call (block 335—NO), then the UE 120 may add a bias to an anchor serving or neighbor cell handover measurement (block 340). For example, in some aspects, the UE 120 may be configured by a BS (e.g., BS 110) to perform a measurement, such as an A3 measurement event associated with identifying a target cell for a handover. If the UE 120 is configured to perform such a measurement, it may be possible or likely that a neighbor cell with a superior measurement to the anchor cell can be identified, since the anchor cell was identified based at least in part on the list of anchor cells. In that case, the UE 120 is likely to be handed over to the neighbor cell even if the neighbor cell is a non-anchor cell, thus causing the UE 120 to lose the MR-DC or EN-DC connection. Thus, if no VoLTE or ViLTE call is active on an LTE connection of the UE 120, the UE 120 may bias measurements to increase the likelihood that the UE 120 remains on the anchor cell, thereby preserving the MR-DC or EN-DC connection without diminishing quality of an ongoing VoLTE or ViLTE call. For example, the UE 120 may increase the anchor cell's measurement (e.g., a reference signal received power RSRP and/or another measurement) so that the anchor cell's measurement is more likely to be selected than a neighbor cell's RSRP measurement. As more particular examples, if the RSRP of the anchor cell is greater than or equal to 105 dBm, then the UE 120 may apply an 8 dB bias, and if the RSRP of the anchor cell is less than 105 dBm, then the UE 120 may apply a 3 dB bias.

If the UE 120 is associated with an active VoLTE or ViLTE call (block 335—YES), then the UE 120 may apply a measurement procedure to protect the VoLTE or ViLTE call, as shown by reference number 345. For example, the UE 120 may not apply the bias described in connection with block 340. Thus, the UE 120 may prioritize the quality of the VoLTE or ViLTE call, thereby reducing likelihood that the VoLTE or ViLTE call is interrupted or dropped based at least in part on the bias procedure. As further shown, the UE 120 may proceed to block 320.

As indicated above, FIG. 3 is provided as an example. Other examples may differ from what is described with respect to FIG. 3.

Figure 4:
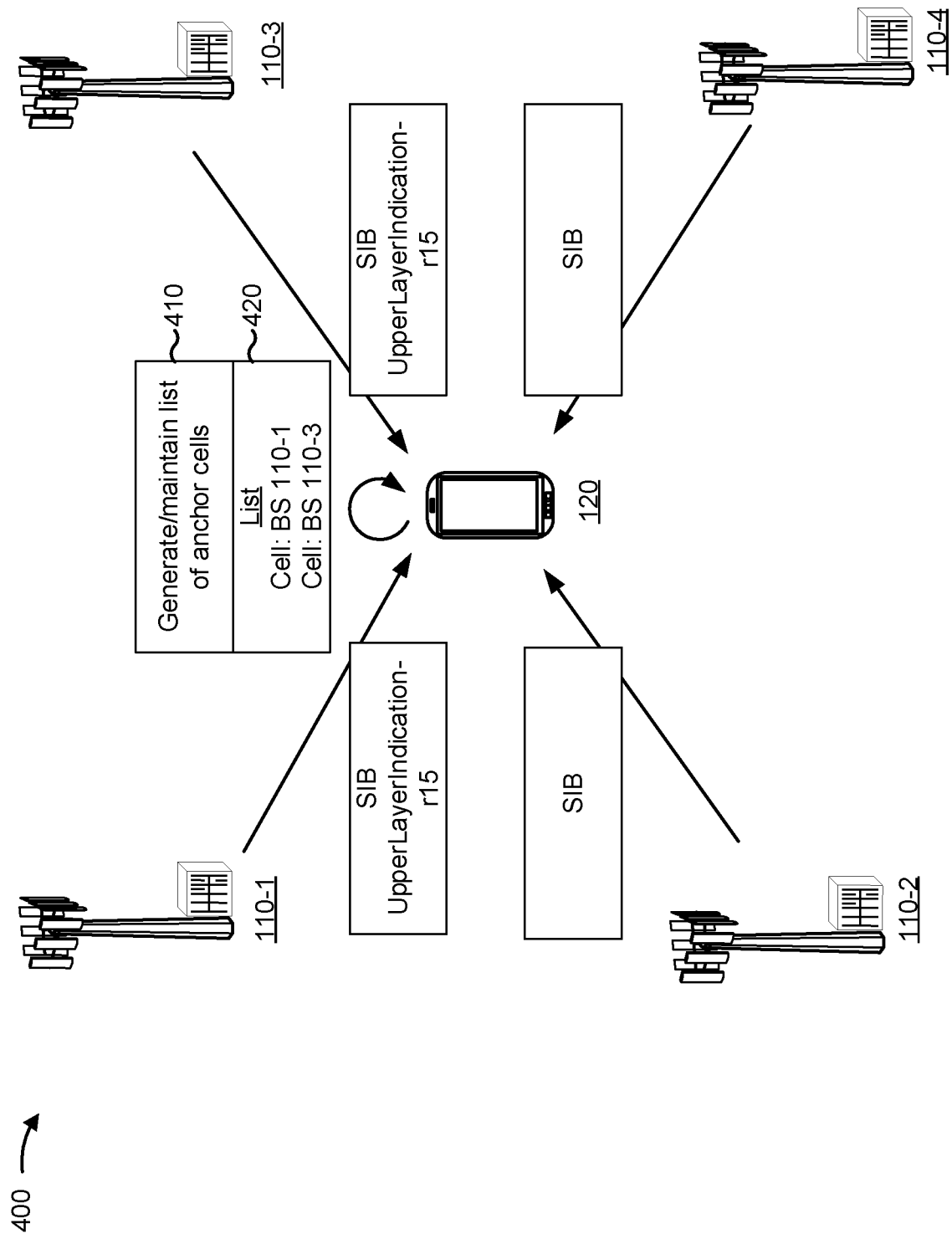
FIG. 4 is a diagram illustrating an example of generation or maintenance of a list of anchor cells, in accordance with various aspects of the present disclosure.

FIG. 4 is a diagram illustrating an example 400 of generation or maintenance of a list of anchor cells, in accordance with various aspects of the present disclosure. As shown in FIG. 4, and by reference number 410, the UE 120 may generate (e.g., determine) and/or maintain a list of anchor cells. For example, the UE 120 may receive system information blocks (SIBs) from a plurality of BSs 110 (shown as BS 110-1, 110-2, 110-3, and 110-4) relating to cells provided by the plurality of BSs 110. As shown by reference number 420, the list may identify cells associated with a 5G capability, such as an MR-DC capability or an EN-DC capability. For example, the cells identified by the list may be associated with a SIB value (shown as UpperLayerIndication-r15) indicating that the cells are anchor cells. Thus, the UE 120 may store information identifying the cells provided by BS 110-1 and 110-3 as anchor cells. The UE 120 may use this information to select cells for connection and transmission/reception, as described in more detail in connection with FIG. 3. In some aspects, the UE 120 may maintain the list, for example, by dropping list entries after a length of time, after moving a threshold distance away from the anchor cell, after rebooting, and/or the like.

As indicated above, FIG. 4 is provided as an example. Other examples may differ from what is described with respect to FIG. 4.

Figure 5:
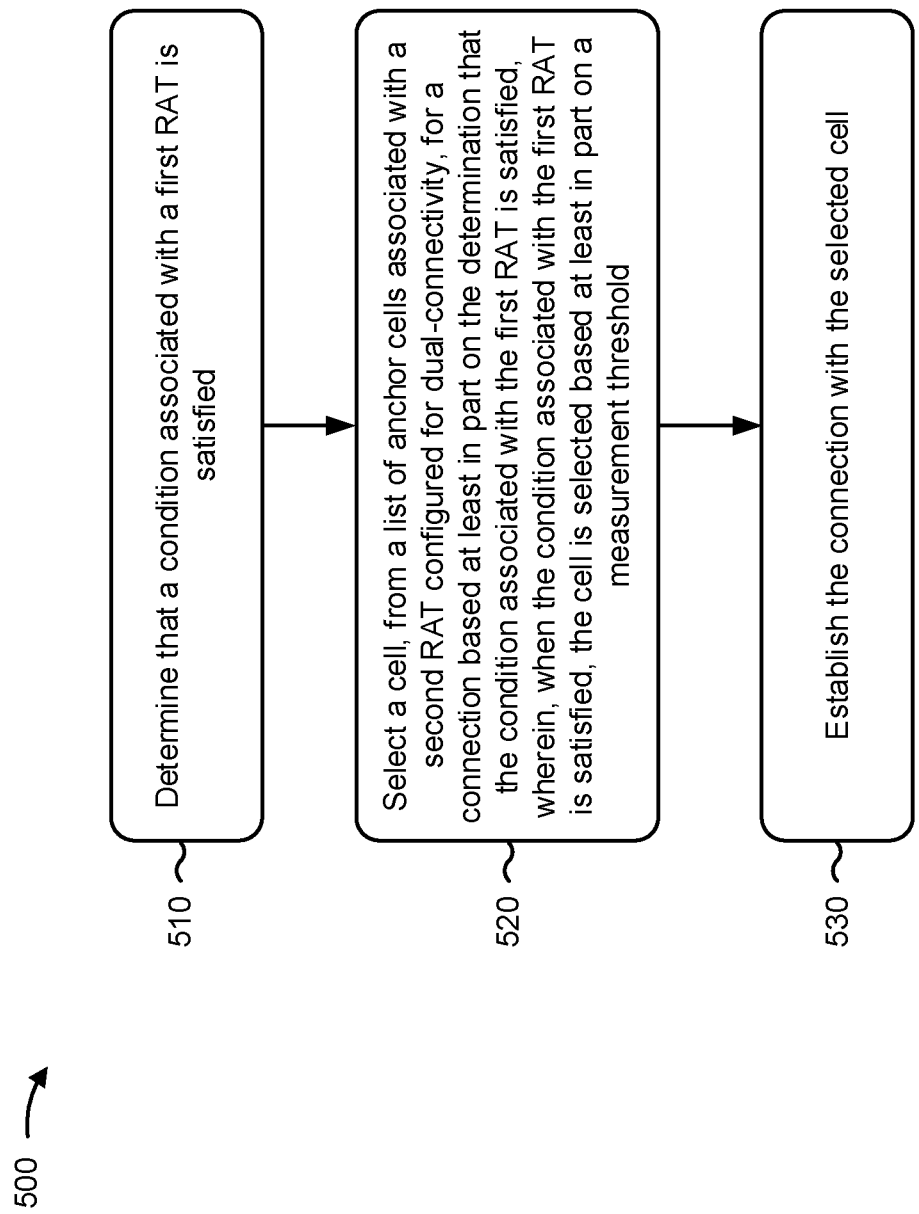
FIG. 5 is a diagram illustrating an example process performed, for example, by a user equipment, in accordance with various aspects of the present disclosure.

FIG. 5 is a diagram illustrating an example process 500 performed, for example, by a user equipment, in accordance with various aspects of the present disclosure. Example process 500 is an example where a UE (e.g., UE 120 and/or the like) performs operations associated with techniques for cell selection for dual-connectivity.

As shown in FIG. 5, in some aspects, process 500 may include determining that a condition associated with a first RAT is satisfied (block 510). For example, the UE (e.g., using antenna 252, DEMOD 254, MIMO detector 256, receive processor 258, controller/processor 280, and/or the like) may determine that a condition associated with a first RAT is satisfied, as described above.

As further shown in FIG. 5, in some aspects, process 500 may include selecting a cell, from a list of anchor cells associated with a second RAT and configured for dual-connectivity, for a connection based at least in part on the determination that the condition associated with the first RAT is satisfied, wherein, when the condition associated with the first RAT is satisfied, the cell is selected based at least in part on a measurement threshold (block 520). For example, the UE (e.g., using antenna 252, DEMOD 254, MIMO detector 256, receive processor 258, controller/processor 280, and/or the like) may select a cell, from a list of anchor cells associated with a second RAT and configured for dual-connectivity, for a connection based at least in part on the determination that the condition associated with the first RAT is satisfied, as described above. In some aspects, when the condition associated with the first RAT is satisfied, the cell is selected based at least in part on a measurement threshold. For example, the measurement threshold may relate to an SSS SNR, a PRACH transmit power, and/or the like.

As further shown in FIG. 5, in some aspects, process 500 may include establishing the connection with the selected cell (block 530). For example, the UE (e.g., using controller/processor 280, transmit processor 264, TX MIMO processor 266, MOD 254, antenna 252, and/or the like) may establish the connection with the selected cell, as described above.

Process 500 may include additional aspects, such as any single aspect or any combination of aspects described below and/or in connection with one or more other processes described elsewhere herein.

In a first aspect, the condition associated with the first RAT is based at least in part on at least one of: a mobile-originated data transfer of the UE, a mobile-terminated data transfer of the UE, a data usage command indicating a data requirement, a battery condition of the UE, or a user interaction.

In a second aspect, alone or in combination with the first aspect, the list of anchor cells is determined by the UE.

In a third aspect, alone or in combination with one or more of the first and second aspects, the list of anchor cells is based at least in part on system information indicating whether a cell is an anchor cell.

In a fourth aspect, alone or in combination with one or more of the first through third aspects, the method further comprises selecting the cell for the connection is based at least in part on the cell on which the UE is camped not being an anchor cell.

In a fifth aspect, alone or in combination with one or more of the first through fourth aspects, selecting the cell for the connection further comprises selecting the cell based at least in part on the selected cell being identified by the list of anchor cells and based at least in part on a measurement regarding the selected cell.

In a sixth aspect, alone or in combination with one or more of the first through fifth aspects, establishing the connection on the selected cell further comprises transmitting a service request or a RACH message on the selected cell.

In a seventh aspect, alone or in combination with one or more of the first through sixth aspects, the method may include performing a measurement procedure to identify a handover target, wherein a measurement associated with the selected cell is adjusted for the measurement procedure.

In an eighth aspect, alone or in combination with one or more of the first through seventh aspects, the measurement associated with the selected cell is adjusted to increase a reference signal received power of the selected cell.

In a ninth aspect, alone or in combination with one or more of the first through eighth aspects, the measurement associated with the selected cell is adjusted based at least in part on no Voice over LTE or Video over LTE call being active as the measurement is performed.

In a tenth aspect, alone or in combination with one or more of the first through ninth aspects, the list of anchor cells identifies one or more anchor cells for an E-UTRA-NR dual connectivity (EN-DC) UE.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
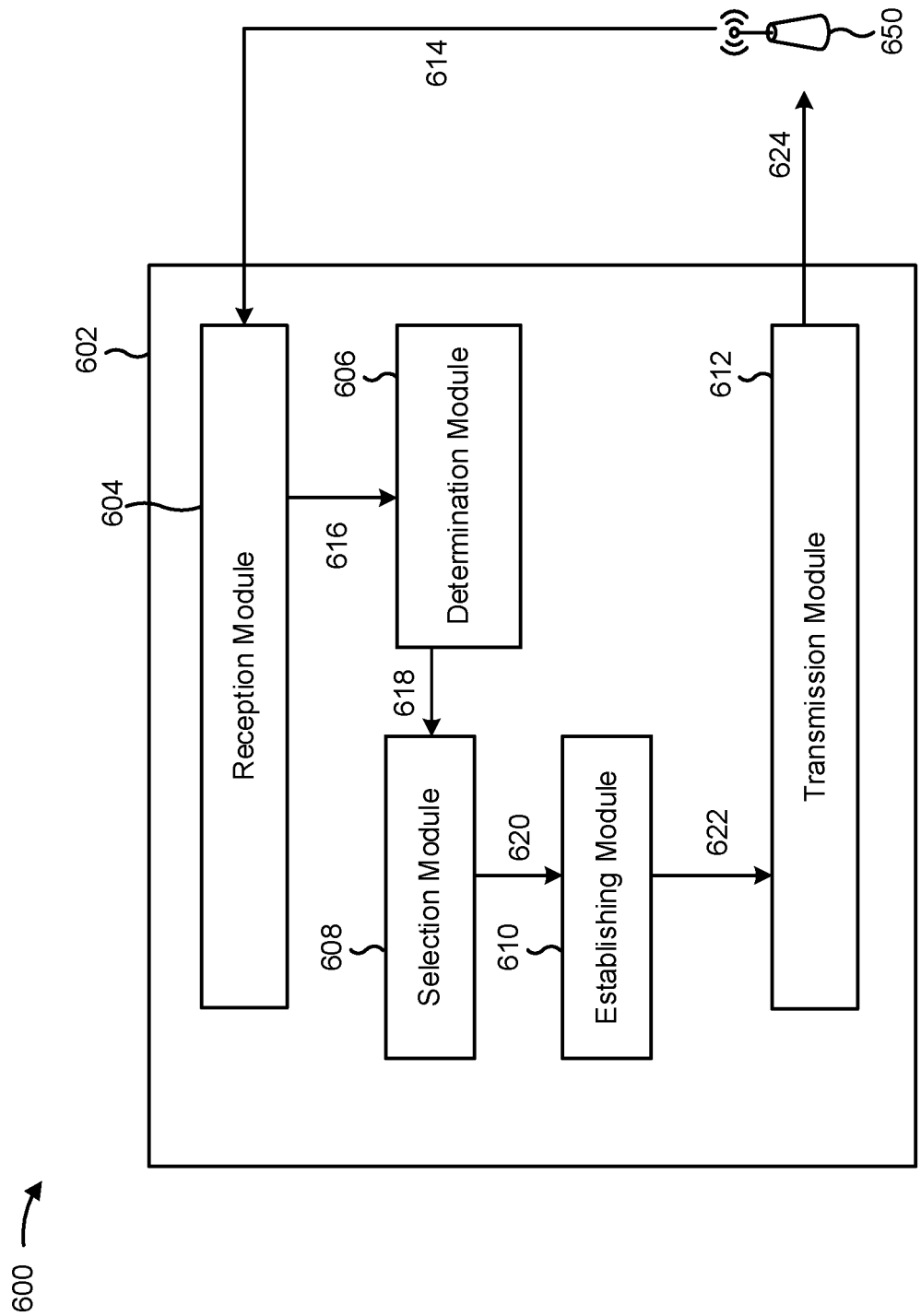
FIG. 6 is a conceptual data flow diagram illustrating the data flow between different modules/means/components in an example apparatus, in accordance with various aspects of the present disclosure.

FIG. 6 is a conceptual data flow diagram 600 illustrating the data flow between different modules/means/components in an example apparatus 602. The apparatus 602 may be a UE (e.g., UE 120). In some aspects, the apparatus 602 includes a reception module 604, a determination module 606, a selection module 608, an establishing module 610, and/or a transmission module 612.

The reception module 604 may receive signals 614 from a BS 650 (e.g., BS 110). The signals 610 may include, for example, system information, a downlink communication, a synchronization signal (e.g., an SSS and/or the like), a grant for an uplink communication, and/or the like. In some aspects, the reception module 604 may perform a measurement procedure to identify a handover target. The reception module may provide data 616 to the determination module 606. The data 616 may include, for example, the system information, the downlink communication, the synchronization signal, the grant for the uplink communication, the handover target, and/or the like. The determination module 606 may determine that a condition associated with a first RAT (e.g., 5G/NR) is satisfied; determine a list of anchor cells (e.g., based at least in part on the system information), determine that a cell on which the UE is camped is not an anchor cell, and/or the like. The determination module 606 may provide data 618 to the selection module 608. The selection module 608 may select a cell for a connection based at least in part on the determination that the condition associated with the first RAT is satisfied based at least in part on the data 618. The selection module 608 may provide data 620 to the establishing module 610. The data 620 may indicate the selected cell. The establishing module 610 may establish a connection with the selected cell. For example, the establishing module 610 may provide an instruction 622 to the transmission module 612 to cause the transmission module 612 to transmit signals 624 to the BS 650. The signals 624 may include, for example, a RACH message or service request to establish a connection with an anchor cell, an uplink communication, and/or the like.

The apparatus 602 may include additional components that perform each of the blocks of the algorithm in the aforementioned process 500 of FIG. 5 and/or the like. Each block in the aforementioned process 500 of FIG. 5 and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally, or alternatively, a set of components (e.g., one or more components) shown in FIG. 6 may perform one or more functions described as being performed by another set of components shown in FIG. 6.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   determining that a condition associated with a first radio access technology (RAT) is satisfied;
   selecting a cell, from a list of anchor cells associated with a second RAT and configured for dual-connectivity, for a connection based at least in part on the determination that the condition associated with the first RAT is satisfied, wherein, when the condition associated with the first RAT is satisfied, the cell is selected based at least in part on a measurement threshold; and
   establishing the connection with the selected cell;
   performing one or more measurements to identify a handover target; and
   adjusting, based at least in part on no Voice over LTE or Video over LTE call being active as the one or more measurements are performed, a first measurement of the one or more measurements, wherein the first measurement is associated with the selected cell.

2. The method of claim 1, wherein the condition associated with the first RAT is based at least in part on at least one of:
   a mobile-originated data transfer of the UE,
   a mobile-terminated data transfer of the UE,
   a data usage command indicating a data requirement,
   a battery condition of the UE, or
   a user interaction.

3. The method of claim 1, wherein the list of anchor cells is determined by the UE.

4. The method of claim 1, wherein the list of anchor cells is based at least in part on system information indicating whether a cell is an anchor cell.

5. The method of claim 1, further comprising:
   determining that a cell on which the UE is camped is not an anchor cell, wherein selecting the cell for the connection is based at least in part on the cell on which the UE is camped not being an anchor cell.

6. The method of claim 1, wherein selecting the cell for the connection further comprises selecting the cell based at least in part on the selected cell being identified by the list of anchor cells and based at least in part on the first measurement regarding the selected cell.

7. The method of claim 1, wherein establishing the connection on the selected cell further comprises transmitting a service request or a random access channel (RACH) message on the selected cell.

8. The method of claim 1, wherein the first measurement associated with the selected cell is adjusted to increase a reference signal received power of the selected cell.

9. The method of claim 1, wherein the list of anchor cells identifies one or more anchor cells for an E-UTRA-NR dual connectivity (EN-DC) UE.

10. A user equipment (UE) for wireless communication, comprising:
    one or more memories; and
    one or more processors coupled to the one or more memories, the one or more processors configured to:
      determine that a condition associated with a first radio access technology (RAT) is satisfied;
      select a cell, from a list of anchor cells associated with a second RAT and configured for dual-connectivity, for a connection based at least in part on the determination that the condition associated with the first RAT is satisfied, wherein, when the condition associated with the first RAT is satisfied, the cell is selected based at least in part on a measurement threshold; and
      establish the connection with the selected cell;
      perform one or more measurements to identify a handover target; and
      adjust, based at least in part on no Voice over LTE or Video over LTE call being active as the one or more measurements are performed, a first measurement of the one or more measurements, wherein the first measurement is associated with the selected cell.

11. A non-transitory computer-readable medium storing one or more instructions for wireless communication, the one or more instructions comprising:
    one or more instructions that, when executed by one or more processors of a user equipment (UE), cause the one or more processors to:
      determine that a condition associated with a first radio access technology (RAT) is satisfied;
      select a cell, from a list of anchor cells associated with a second RAT and configured for dual-connectivity, for a connection based at least in part on the determination that the condition associated with the first RAT is satisfied, wherein, when the condition associated with the first RAT is satisfied, the cell is selected based at least in part on a measurement threshold; and establish the connection with the selected cell; and perform one or more measurements to identify a handover target; and adjust, based at least in part on no Voice over LTE or Video over LTE call being active as the one or more measurements are performed, a first measurement of the one or more measurements, wherein the first measurement is associated with the selected cell.

12. The UE of claim 10, wherein the condition associated with the first RAT is based at least in part on at least one of:

a mobile-originated data transfer of the UE, a mobile-terminated data transfer of the UE, a data usage command indicating a data requirement, a battery condition of the UE, or a user interaction.

13. The UE of claim 10, wherein the list of anchor cells is determined by the UE.

14. The UE of claim 10, wherein the list of anchor cells is based at least in part on system information indicating whether a cell is an anchor cell.

15. The UE of claim 10, wherein the one or more processors are configured to:

determine that a cell on which the UE is camped is not an anchor cell, wherein selecting the cell for the connection is based at least in part on the cell on which the UE is camped not being an anchor cell.

16. The UE of claim 10, wherein, to select the cell for the connection, the one or more processors are further configured to select the cell based at least in part on the selected cell being identified by the list of anchor cells and based at least in part on the first measurement regarding the selected cell.

17. The UE of claim 10, wherein, to establish the connection on the selected cell, the one or more processors are further configured to transmit a service request or a random access channel (RACH) message on the selected cell.

18. The UE of claim 10, wherein the first measurement associated with the selected cell is adjusted to increase a reference signal received power of the selected cell.

19. The UE of claim 10, wherein the list of anchor cells identifies one or more anchor cells for an E-UTRA-NR dual connectivity (EN-DC) UE.

20. The non-transitory computer-readable medium of claim 11, wherein the condition associated with the first RAT is based at least in part on at least one of:

a mobile-originated data transfer of the UE, a mobile-terminated data transfer of the UE, a data usage command indicating a data requirement, a battery condition of the UE, or a user interaction.

21. The non-transitory computer-readable medium of claim 11, wherein the list of anchor cells is determined by the UE.

22. The non-transitory computer-readable medium of claim 11, wherein the list of anchor cells is based at least in part on system information indicating whether a cell is an anchor cell.

23. The non-transitory computer-readable medium of claim 11, wherein the one or more instructions that, when executed by the one or more processors of the UE, further cause the one or more processors to:

determine that a cell on which the UE is camped is not an anchor cell, wherein selecting the cell for the connection is based at least in part on the cell on which the UE is camped not being an anchor cell.

24. The non-transitory computer-readable medium of claim 11, wherein the one or more instructions for selecting the cell for the connection, when executed by the one or more processors of the UE, further cause the one or more processors to:

select the cell based at least in part on the selected cell being identified by the list of anchor cells and based at least in part on the first measurement regarding the selected cell.

* * * * *